United States Patent
Sankaran et al.

(10) Patent No.: US 11,816,116 B2
(45) Date of Patent: Nov. 14, 2023

(54) FACILITATING QUERIES OF ENCRYPTED SENSITIVE DATA VIA ENCRYPTED VARIANT DATA OBJECTS

(71) Applicant: EQUIFAX INC., Atlanta, GA (US)

(72) Inventors: Yuvaraj Sankaran, Alpharetta, GA (US); Vijay Nagarajan, Cumming, GA (US)

(73) Assignee: Equifax, Inc., Atlanta, GA (US)

( * ) Notice: Subject to any disclaimer, the term of this patent is extended or adjusted under 35 U.S.C. 154(b) by 53 days.

(21) Appl. No.: 16/982,898

(22) PCT Filed: Mar. 22, 2019

(86) PCT No.: PCT/US2019/023598
§ 371 (c)(1),
(2) Date: Sep. 21, 2020

(87) PCT Pub. No.: WO2019/183483
PCT Pub. Date: Sep. 26, 2019

(65) Prior Publication Data
US 2021/0004373 A1    Jan. 7, 2021

Related U.S. Application Data

(60) Provisional application No. 62/646,961, filed on Mar. 23, 2018.

(51) Int. Cl.
*G06F 16/2458* (2019.01)
*G06F 16/2453* (2019.01)
(Continued)

(52) U.S. Cl.
CPC ...... *G06F 16/2468* (2019.01); *G06F 16/2455* (2019.01); *G06F 16/24534* (2019.01);
(Continued)

(58) Field of Classification Search
CPC .......... G06F 16/2468; G06F 16/24534; G06F 16/2455; G06F 21/602; G06F 21/6245;
(Continued)

(56) References Cited

U.S. PATENT DOCUMENTS

2002/0099536 A1* 7/2002 Bordner ............... G06F 40/284
                                                                 704/10
2004/0193905 A1    9/2004 Lirov et al.
(Continued)

FOREIGN PATENT DOCUMENTS

WO    2014028524 A1    2/2014
WO    2015171241 A1    11/2015

OTHER PUBLICATIONS

PCT/US2019/023598, "International Search Report and Written Opinion", dated Sep. 3, 2020, 12 pages.
(Continued)

*Primary Examiner* — Richard L Bowen
*Assistant Examiner* — Aryan D Toughiry
(74) *Attorney, Agent, or Firm* — Kilpatrick Townsend & Stockton LLP

(57) ABSTRACT

Various aspects of this disclosure provide digital data processing systems for using encrypted variant data objects to facilitate queries of sensitive data. In one example, a digital data processing system can receive sensitive data about an entity. The digital data processing system can create, in an identity data repository and from the sensitive data, a searchable secure entity data object for the entity. The searchable secure entity data object is usable for servicing a query regarding the entity. For instance, a transformed query parameter can be generated from a query parameter in the query. The query can be serviced by matching the transformed query parameter to tokenized variant data in the
(Continued)

searchable secure entity data object and retrieving tokenized sensitive data from the searchable secure entity data object.

20 Claims, 4 Drawing Sheets

(51) Int. Cl.
    *G06F 16/2455*     (2019.01)
    *G06F 40/284*     (2020.01)
    *G06F 21/60*     (2013.01)
    *G06F 21/62*     (2013.01)

(52) U.S. Cl.
    CPC ........ *G06F 21/602* (2013.01); *G06F 21/6245* (2013.01); *G06F 40/284* (2020.01)

(58) Field of Classification Search
    CPC . G06F 40/284; G06F 21/6227; H04L 2209/42
    See application file for complete search history.

(56) References Cited

U.S. PATENT DOCUMENTS

| | | | |
|---|---|---|---|
| 2008/0114991 | A1 | 5/2008 | Jonas |
| 2016/0092486 | A1* | 3/2016 | Mattsson ............ G06F 16/2455 707/756 |
| 2016/0224804 | A1* | 8/2016 | Carasso .............. G06F 16/2322 |
| 2016/0232362 | A1 | 8/2016 | Conway |
| 2016/0292451 | A1 | 10/2016 | Diep et al. |
| 2017/0024657 | A1* | 1/2017 | Sahu ..................... G06F 16/951 |
| 2017/0116428 | A1* | 4/2017 | Wu ..................... G06F 21/6209 |
| 2017/0116607 | A1 | 4/2017 | Leighton |
| 2018/0103020 | A1* | 4/2018 | Moiyallah, Jr. ..... H04W 12/068 |
| 2018/0276718 | A1* | 9/2018 | Thomas ............. G06Q 30/0276 |

OTHER PUBLICATIONS

European Patent Application No. 19770620.3, "Extended European Search Report", dated Nov. 11, 2021, 8 pages.
Gedam, et al., "Fuzzy Keyword Search Over Encrypted Data in Cloud Computing", Available Online at: http://www.ijera.com/papers/Vol4_issue7/Version%203/AF04703197202.pdf, vol. 4, Issue 7, Journal of Engineering Research and Applications, Jul. 2014, pp. 197-202.
Xu, et al., "Privacy-Preserving Ranked Fuzzy Keyword Search over Encrypted Cloud Data", 2013 International Conference on Parallel and Distributed Computing, Applications and Technologies, Dec. 16, 2013, pp. 239-245.
IN202037040876, "First Examination Report", dated Aug. 5, 2022, 6 pages.

* cited by examiner

FACILITATING QUERIES OF ENCRYPTED SENSITIVE DATA VIA ENCRYPTED VARIANT DATA OBJECTS

CROSS-REFERENCE TO RELATED APPLICATIONS

This application claims the benefit of priority of U.S. provisional patent application No. 62/646,961 entitled "Facilitating Queries of Encrypted Sensitive Data via Encrypted Vault Variant Data," filed Mar. 23, 2018, the disclosures of which are hereby incorporated by reference.

TECHNICAL FIELD

This disclosure relates generally to controlling access to electronic data stored in secured data structures, and more specifically relates to computers and digital data processing systems for using encrypted variant data objects to facilitate queries (e.g., fuzzy searches) of sensitive data that has been tokenized or otherwise encrypted.

BACKGROUND

Electronic transactions involve secure exchanges of data among different, remotely located entities via one or more online services. This data could include sensitive information, such as personally identifiable information ("PII"). For instance, PII may be collected from various batch-based contributor systems and consolidated into one or more data repositories. The stored PII in these repositories can be used to perform various analytical services that are provided to client systems.

The transmission, storage, and use of sensitive data among many different online platforms increases the risk of this data being exposed to unauthorized entities. Securing this sensitive data can involve restricting access to the repositories in which the data is stored. But a breach into these repositories can result in rapid, unauthorized dissemination of sensitive data, especially if PII or other sensitive data is stored in the clear to facilitate the analytical services discussed above.

SUMMARY

Various aspects of the present disclosure provide digital data processing systems for using encrypted variant data objects to facilitate queries of sensitive data that has been tokenized or otherwise encrypted. In one example, a digital data processing system can include a non-transitory computer-readable memory coupled to a processing device. The digital data processing system can store a secure identity data structure. The secure identity data structure can include a tokenized sensitive data object having encrypted versions of account or transaction data regarding an entity. The secure identity data structure can also include a tokenized variant data object having a modified version of account or transaction data. The secure identity data structure can also include a common entity identifier linking the tokenized sensitive data object and the tokenized variant data object. The digital data processing system can service a query regarding the entity using the secure identity data structure. Servicing the query can include matching a transformed version of a query parameter to the tokenized sensitive data object and retrieving the tokenized variant data object from the secure identity data structure using the common entity identifier.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim. The foregoing, together with other features and examples, will become more apparent upon referring to the following specification, claims, and accompanying drawings.

BRIEF DESCRIPTION OF THE DRAWINGS

Features, embodiments, and advantages of the present disclosure are better understood when the following Detailed Description is read with reference to the accompanying drawings, where.

DETAILED DESCRIPTION

Figure 1:
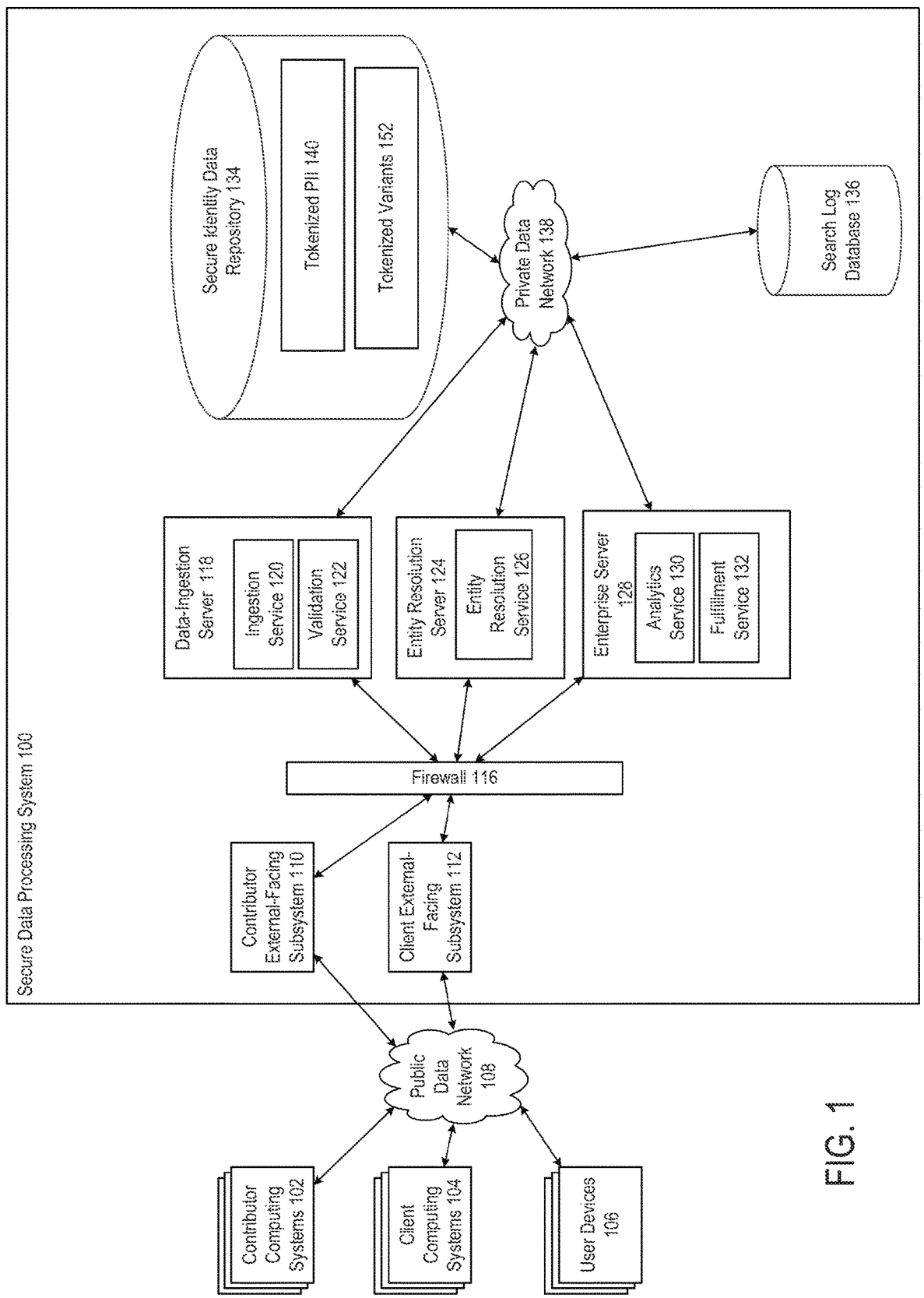
FIG. 1 is a block diagram depicting an example of an operating environment in which a secure data processing system can securely store sensitive data in a manner that facilitates queries using fuzzy search logic, according to certain embodiments.

Certain aspects and features of the present disclosure involve facilitating queries, such as fuzzy searches, of secure sensitive data by storing tokenized versions of both sensitive data items, such as personally identifiable information ("PII"), as well as tokenized variants of the sensitive data items. Storing tokenized versions of entity data objects describing a particular entity can increase the security of the data objects, since a breach of a particular system will not provide access to information in the clear. Furthermore, supplementing the entity data objects with variant data objects, which could include common variations of PII or other sensitive data, can allow this securely stored data to be queried in a similar manner as the sensitive data in the clear (e.g., via a fuzzy search).

The use of computing devices to store and manage databases has become increasingly important for business. For example, businesses develop and use valuable databases that contain transactions and information relating to users of the business's products and services. Various analytical services provided by these businesses could require storing sensitive data in the clear in order to facilitate fuzzy matching. But storing sensitive data in the clear increases the risk of unauthorized use of this information in the event that a security breach occurs with respect to the stored data. Thus, in existing systems, maintaining the ability to perform fuzzy searches of sensitive data requires decreasing the security of this data. For instance, storing an encrypted version of a target entity data object storing PII (e.g., the name "Joe Snuffy") will not permit a fuzzy search for the PII (e.g., for "J Snuffy," "Joseph Snuffy," "Joe Snuf") to return the entity data object.

Certain aspects described herein can overcome the limitations of existing systems by creating a repository of searchable secure entity data objects. A searchable secure entity data object can include one or more entity data items that have been tokenized or otherwise encrypted. The entity data items can include sensitive data describing one or more attributes of an entity. The searchable secure entity data object can also include tokenized (or otherwise encrypted) variant data items, which are tokenized versions of variants generated from the sensitive data. For example, a secure data repository can be created within a secure data processing system for storing tokenized versions of PII or other entity data objects. Tokenized entity data objects can be disseminated through various computing sub-systems in the secure data processing system (e.g., analytics systems, fulfillment systems, etc.). In some cases, individual entity data objects can be decrypted as needed in response to requests from specific client systems. But, outside of these specific requests, sensitive data is stored in a tokenized manner rather than being stored in the clear. Furthermore, because individual tokens cannot support fuzzy matching, the secure data processing system can generate and store fuzzy tokenized variants for particular sensitive data.

In one example, if the secure data processing system receives a particular item of PII, such as the name "Joe Snuffy," the secure data processing system can generate variants of the PII item. The generated variants can correspond to search terms generated by a fuzzy search or other query technique that retrieves results without requiring an exact match to a search term. For instance, a fuzzy search could find results for the query parameter "Joe Snuffy" even if the search results include only partial matches (e.g., "J Snuffy" and "Jo Snuff"). In the secure data processing system described herein, the variants of the PII "Joe Snuffy" could include these partially matching strings, i.e., "J Snuffy" and "Jo Snuff."

Continuing with this example, the secure data processing system can tokenize both the received PII item and one or more generated variants. The tokenization can include, for example, applying different encryption schemes to different data elements in the data object (e.g., encrypting a first name "Joe" differently than the last name "Snuffy" in a record for "Joe Snuffy") rather than applying the same encryption scheme to the data object (e.g., encrypting "Joe" and "Snuffy" in the same manner by applying the same encryption scheme to the entire record for "Joe Snuffy"). The secure data processing system can link the tokenized PII item and the tokenized variants to a common entity identifier for the entity indicated by the PII (e.g., an entity identifier of "12345" for the person named Joe Snuffy). The secure data processing system can thereby generate a secure searchable entity data object having the tokenized PII item, the tokenized variants, and the common entity identifier linking the tokenized PII and tokenized variants.

Storing these variants and associating them with the same entity as the original PII facilitates a query of the tokenized data that could provide similar functionality as fuzzy searching. For instance, a subsequent query could include a query parameter such as the search term "J Snuff" which does not exactly match the "Joe Snuffy" string received in the example above. The secure data processing system can tokenize the query parameter "J Snuff" The secure data processing system can match the tokenized version of the query parameter "J Snuff" to a searchable entity data object having a tokenized version of the variant "J Snuff" that was generated for the received PII "Joe Snuffy." The secure data processing system can retrieve, from the searchable entity data object, the tokenized version of the received PII "Joe Snuffy" based on the retrieved token being associated with the common entity identifier "12345" that links the tokenized PII and its tokenized variants. The secure data processing system can provide the PII "Joe Snuffy" (either as a token or in the clear) as a query result for the query on "J Snuff" Thus, data regarding the entity corresponding to this search term (e.g., the entity "Joe Snuffy") can be stored in a manner that is both secure (due to tokenization) and searchable (due to the use of variants described above).

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative examples but, like the illustrative examples, should not be used to limit the present disclosure.

Operating Environment Example for Facilitating Queries Using Variant Data Objects FIG. 1 is a block diagram depicting an example of an operating environment in which a secure data processing system 100 can securely store sensitive data in a manner that facilitates queries using fuzzy search logic. FIG. 1 depicts examples of hardware components of a secure data processing system 100, according to some aspects. The secure data processing system 100 is a specialized computing system that may be used for processing large amounts of data using a large number of computer processing cycles. The number of devices depicted in FIG. 1 are provided for illustrative purposes. Different numbers of devices may be used. For example, while certain devices or systems are shown as single devices in FIG. 1, multiple devices may instead be used to implement these devices or systems.

The secure data processing system 100 can include a data-ingestion server 118. The data-ingestion server 118 can receive sensitive data from one or more contributor computing systems 102. The data-ingestion server 118 can transform the secure data processing system 100 for secure storage that facilitates fuzzy search capability or other queries. For instance, an ingestion service 120 executed by the data-ingestion server 118 can tokenize or otherwise encrypt PII or other sensitive data provided by the contributor computing systems 102. The ingestion service 120 can store the encrypted sensitive data in a secure identity data repository 134, which can be stored at or otherwise accessible via a private data network 138. This sensitive data can include any information that can be used to uniquely identify an individual or other entity. Some sensitive data can be used on its own to identify an individual or entity. Non-limiting examples of such sensitive data include one or more of a legal name, a company name, a social insurance number, a credit card number, a date of birth, an e-mail address, etc. In other aspects, sensitive data can include information that can be used in combination with other information to identify an individual or entity. Non-limiting examples of such consumer identification data include a street address or other geographical location, employment data, etc. In some aspects, the secure identity data repository 134 can contain tokenized PII 140 and tokenized variants 152 of various PII items. PII can include or be extracted from different kinds of data obtained from contributor computing systems 102, such as credit data, property data, transaction data, demographic data, employment data, payday lending data, etc. In some aspects, the PII and variants stored in the secure identity data repository 134 can be encrypted in some other manner other than tokenization.

In some aspects, the ingestion service 120 can use a tokenization manager module. The tokenization manager module can include one or more tokenization policies, keys, or other elements of a tokenization scheme. In one example, the ingestion service 120 can request tokenization policies, keys, etc. from the tokenization manager module and apply the requested tokenization scheme. In another example, the ingestion service 120 can provide the received data to the tokenization manager module, which selects and applies various tokenization policies, keys, etc.

The ingestion service 120 can also generate the tokenized variants 152 of the various identity and transaction data. The tokenized variants 152 can be stored in the secure identity data repository 134. Variants can include commonly used nicknames of a particular name, or equivalencies derived from transactions with user devices. Variants can be based on historical search terms such as synonyms or misspellings, such as "Smith," "Smth," or "Smih." In some aspects, the ingestion service 120 can perform one or more natural language processing techniques (e.g., consecutive character, edit distance, double metaphone, etc.) to generate the variants. In additional or alternative aspects, the ingestion service 120 can generate variants that correspond to previously searched terms. For instance, a search log database 136 could include logs of search terms (e.g., "Jack," "Jon," "Jhon") that were matched to a certain PII item (e.g., the name "John"). If the ingestion service 120 receives that PII item, the ingestion service 120 can query the search log database 136, retrieve the corresponding historical search terms for that PII item, and use the retrieved historical search terms as variants for that PII item.

The validation service 122 can perform one or more validation operations on sensitive data that has been received from the contributor computing system 102. Examples of validation operations include, for example, removing white spaces, standardizing terms such as addresses or job titles, etc. In some aspects, the validation service 122 can be applied to received data before that data is tokenized or otherwise encrypted by the ingestion service 120. The ingestion service 120 may, for example, determine that certain validation operations must be applied to PII in the clear (e.g., standardizing mailing address formats) in order to operate properly. The ingestion service 120 can provide data items requiring such validation operations to the validation service 122. The ingestion service 120 can subsequently receive modified data from the validation service 122 (e.g., data elements that have been standardized by the validation service 122). The ingestion service 120 can tokenize or otherwise encrypt the modified data received from the validation service 122. In additional or alternative aspects, the validation service 122 can be applied to received data after that data has been tokenized or otherwise encrypted by the ingestion service 120.

In some aspects, the secure data processing system 100 can also include one or more entity resolution servers 124. An entity resolution server 124 can execute an entity resolution service 126. The entity resolution service 126 can create one or more common entity identifiers for entity information received from different computing systems. The entity resolution service 126 can populate the secure identity data repository 134 with data objects (e.g., common entity identifiers) that can be derived from different sources. For example, entity resolution server 124 can combine online transaction data with credit data.

In some aspects, the entity resolution service 126 can be applied to encrypted versions of sensitive data (e.g., tokenized PII) to perform entity resolution. For instance, the secure identity data repository 134 can include tokenized data objects (e.g., tokenized PII, tokenized credit data, etc.) for a particular entity, where the tokenized data objects for the particular entity have a common entity identifier. Thus, even though the sensitive data for the particular entity is encrypted, the secure identity data repository 134 can include a common entity identifier in each tokenized data object and thereby indicate that the tokenized data objects refer to the particular entity. Subsequently, the entity resolution service 126 can receive input data that has been provided by a contributor computing system 102. The input data can be tokenized by the ingestion service 120. The entity resolution service 126 can match the tokenized input data to one or more tokenized data objects referring to the particular entity (i.e., tokenized data objects having the common entity identifier). The entity resolution service 126 can determine, based on the match, that the tokenized input data should be associated with the particular entity. The entity resolution service 126 can therefore assign the common entity identifier to the tokenized input data. Examples of assigning the common entity identifier to the tokenized input data include adding the tokenized input data to one or more existing data objects having the entity identifier, creating one or more new data objects for storing the tokenized input data along with the entity identifier, etc.

In some aspects, the secure data processing system 100 can also include one or more enterprise servers 128. An enterprise server 128 can execute various back-end services, such as an analytics service 130. The analytics service 130 can include one or more platforms for processing tokenized data (or other encrypted sensitive data) from the secure identity data repository 134 and thereby generating analytical outputs from the data, such as predictive analysis, trend analysis, etc. Additionally or alternatively, an enterprise server 128 can execute various front-end services, such as a fulfillment service 132, accessible by client computing systems 104. A fulfillment service 132 can provide a client computing system 104 with access to certain analytical or predictive outputs from the analytics service 130. A fulfillment service 132 can provide a client computing system 104 with access to at least some entity resolution data that may be generated or obtained with the entity resolution service 126.

One or more of the servers depicted in FIG. 1 (e.g., the data-ingestion server 118, the entity resolution server 124, and the enterprise server 128) may be a specialized computer or other machine that processes the data received within the secure data processing system 100. A server may include one or more other systems. For example, a server may include a database system for accessing the network-attached storage unit, a communications grid, or both. A communications grid may be a grid-based computing system for processing large amounts of data. Each server can include one or more processing devices that execute program code, such as the ingestion service 120, the validation service 122, the entity resolution service 126, etc. The program code can be stored on a non-transitory computer-readable medium.

The secure data processing system 100 may use various external-facing subsystems to interact via one or more public data networks 108 such as the Internet, with contributor computing systems 102 and client computing systems 104. For example, the secure data processing system 100 can include a contributor external-facing subsystem 110 and a client external-facing subsystem 112. Each external-facing subsystem may include one or more computing devices that provide a physical or logical subnetwork (sometimes referred to as a "demilitarized zone" or a "perimeter network") that expose certain online functions of the secure data processing system 100 to an untrusted network, such as the Internet or public data network 108. In some aspects, these external-facing subsystems can be implemented as edge nodes, which provide an interface between the public data network 108 and a cluster computing system, such as a Hadoop cluster used by the secure data processing system 100.

Each external-facing subsystem can be communicatively coupled, optionally via a firewall device 116, to one or more computing devices forming a private data network 138. The firewall 116, which can include one or more devices, can create a secured part of the secure data processing system 100 that includes various devices in communication via the private data network 138. In some aspects, the secure data processing system 100 can house the secure identity data repository 134 in an isolated network (i.e., the private data network 138) that has no direct accessibility via the Internet or another public data network 108.

Each communication within the secure data processing system 100 may occur over one or more data networks, such as a public data network 108, a private data network 138, or some combination thereof. A data network may include network computers, sensors, databases, or other devices that may transmit or otherwise provide data to secure data processing system 100. For example, a data network may include local area network devices, such as routers, hubs, switches, client devices, or other computer network devices. A data network may include one or more of a variety of different types of networks, including a wireless network, a wired network, or a combination of wired and wireless networks. Examples of suitable networks include the Internet, a personal area network, a local area network ("LAN"), a wide area network ("WAN"), or a wireless local area network ("WLAN"). A wireless network may include a wireless interface or combination of wireless interfaces. A wired network may include a wired interface. The wired or wireless networks may be implemented using routers, access points, bridges, gateways, or the like to connect devices in the data network. The data networks depicted in FIG. 1 can be incorporated entirely within (or can include) an intranet, an extranet, or a combination thereof.

The secure data processing system 100 may also include one or more network-attached storage units on which various repositories, databases, or other data structures are stored. Examples of these data structures are the secure identity data repository 134 and the search log database 136. Network-attached storage units may store a variety of different types of data organized in a variety of different ways and from a variety of different sources. For example, the network-attached storage unit may include storage other than the primary storage located within entity resolution server 124 that is directly accessible by processors located therein. In some aspects, the network-attached storage unit may include secondary, tertiary, or auxiliary storage, such as large hard drives, servers, virtual memory, among other types. Storage devices may include portable or non-portable storage devices, optical storage devices, and various other mediums capable of storing and containing data. A machine-readable storage medium or computer-readable storage medium may include a non-transitory medium in which data can be stored and that does not include carrier waves or transitory electronic signals. Examples of a non-transitory medium may include, for example, a magnetic disk or tape, optical storage media such as compact disk or digital versatile disk, flash memory, memory or memory devices.

In some aspects, the secure data processing system 100 can implement one or more procedures to secure communications between the secure data processing system 100 and other client systems. Non-limiting examples of features provided to protect data and transmissions between the secure data processing system 100 and other client systems include secure web pages, encryption, firewall protection, network behavior analysis, intrusion detection, etc. In some aspects, transmissions with client systems can be encrypted using public key cryptography algorithms using a minimum key size of 128 bits. In additional or alternative aspects, website pages or other data can be delivered through secure hypertext transfer protocol ("HTTPS"), secure file-transfer protocol ("SFTP"), or other secure server communications protocols. In additional or alternative aspects, electronic communications can be transmitted using Secure Sockets Layer ("SSL") technology or other suitable secure protocols. Extended Validation SSL certificates can be utilized to clearly identify a website's organization identity. In another non-limiting example, physical, electronic, and procedural measures can be utilized to safeguard data from unauthorized access and disclosure.

In some aspects, contributor computing system 102 can provide data that is incorporated into secure identity data repository 134 and used by one or more services of the secure data processing system 100. A contributor computing system 102 can include any computing device or group of computing devices operated by one or more data sources or data providers, such as an employer, a payroll system, a human-resource management system, an insurance provider system, a healthcare provider system, an online merchant, a social network system, an e-commerce system, etc. Each contributor computing system 102 may include one or more third-party devices (e.g., computing devices or groups of computing devices), such as individual servers or groups of servers operating in a distributed manner. These devices can include or can otherwise access one or more non-transitory computer-readable media. The contributor computing system 102 can also execute an online service. The online service can include executable instructions stored in one or more non-transitory computer readable media. The contributor computing system 102 can further include one or more processing devices that are capable of storing, formatting, and transmitting data, such as identity-related data, transaction-related data, or device-related data to secure data processing system 100.

Client computing system 104 can include any computing device or group of computing devices operated by a seller, lender, or other provider of products or services. Each client computing system 104 may include one or more third-party devices, such as individual servers or groups of servers operating in a distributed manner. The client computing system 104 can further include one or more processing devices that are capable of executing program code. These devices can include or can otherwise access one or more non-transitory computer-readable media. The client computing system 104 can also execute an online service. The online service can include executable program code stored in one or more non-transitory computer-readable media. In some aspects, the online service can provide an interface (e.g., a website, web server, or other server) to facilitate electronic transactions involving a user of a user device 106. The client computing system 104 may transmit data to and receive data from the user device 106 to enable a transaction.

A user device 106 can include any computing device or other communication device operated by a user, a consumer, or a buyer, for example. The user device 106 can include one or more user devices 106. A user device 106 can include executable instructions stored in one or more non-transitory computer-readable media. The user device 106 can also include one or more processing devices that are capable of executing instructions to perform operations described herein. In some aspects, user device 106 can allow a user to access a secured electronic resource of a client computing system 104.

Examples of Operations for Facilitating Queries of Secure Sensitive Data

Figure 2:
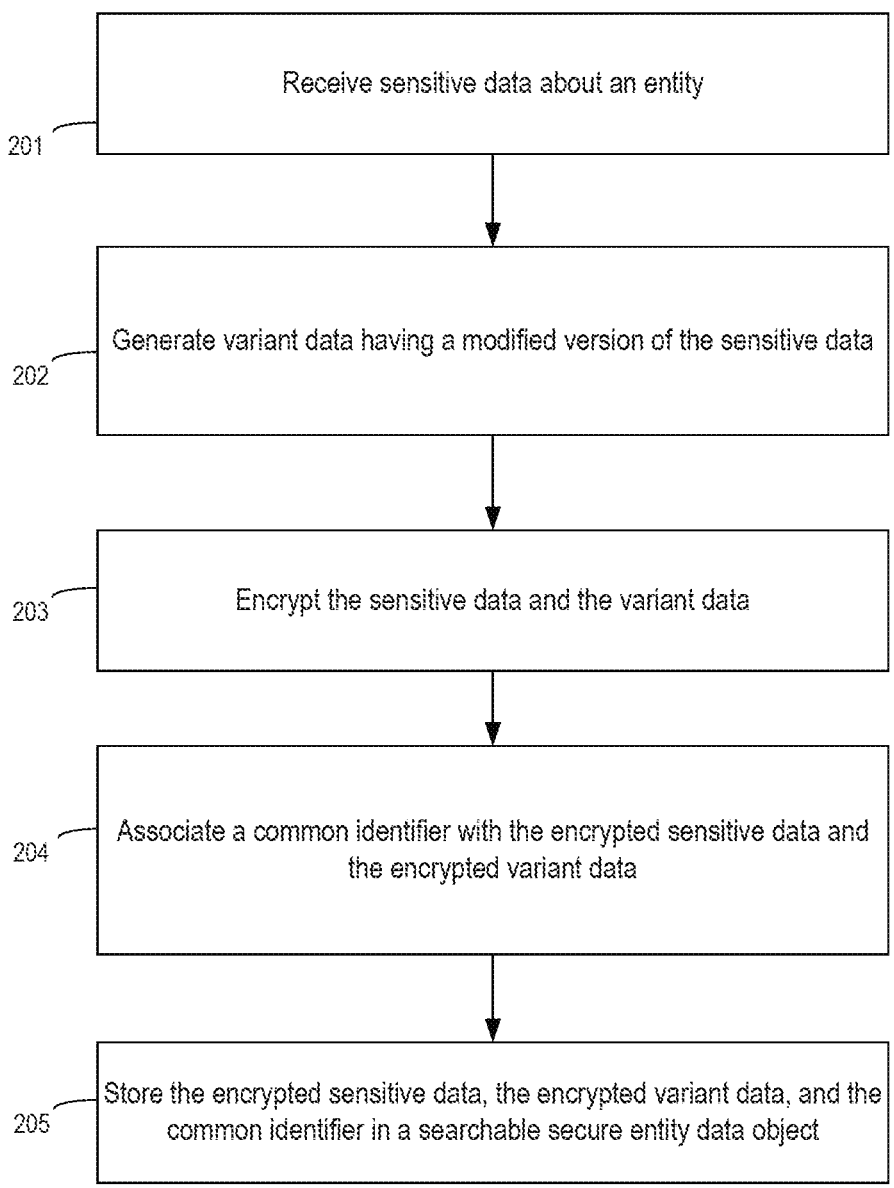
FIG. 2 is a flow chart illustrating an example of a process for generating encrypted data objects that facilitate fuzzy searching, according to certain embodiments.

The secure data processing system 100 can execute one or more processes to facilitate queries (e.g., fuzzy searches) of sensitive data that has been tokenized or otherwise encrypted. For instance, FIG. 2 is a flow chart illustrating an example of a process 200 for generating encrypted data objects that facilitate fuzzy searching. For illustrative purposes, the process 200 is described with reference to implementations described above with respect to one or more examples described herein. Other implementations, however, are possible. In some aspects, the steps in FIG. 2 may be implemented in program code that is executed by one or more computing devices depicted in FIG. 1.

At block 201, the process 200 involves receiving sensitive data about an entity. For example, the secure data processing system 100 can establish one or more communication channels with one or more contributor computing systems 102 via a contributor external-facing subsystem 110. The secure data processing system 100 can receive sensitive data, such as one or more items of PII, from a contributor computing system 102 via such a communication channel. The ingestion service 120 can access the received sensitive data for processing.

At block 202, the process 200 involves generating variant data having a modified version of the sensitive data. For example, the ingestion service 120 can create copies of PII data items or other sensitive data received at block 201. The ingestion service 120 can transform those copies of into different variants that could be used to facilitate fuzzy search logic. A particular variant can correspond to a potential query parameter that is different from the received sensitive data and that could be used to search for the received sensitive data in a fuzzy search process. Examples of these variants include misspellings of the received sensitive data (e.g., the variant "Smth" for the name "Smith"), alternate spellings of the received sensitive data (e.g., the variant "Jo" for the name "Joe"), encoded pronunciations of the received sensitive data that could be used to locate similar sounding words (e.g., the variant "FJ" for the name "Vijay"), etc. One or more suitable processes for generating variants can be used by the ingestion service 120.

One example of a suitable process for generating variants is consecutive-character processing that generates n-grams of the sensitive data. For instance, the sensitive data could be an input string such as "Schwarzenegger." The ingestion service 120 can apply consecutive-character processing to this input string. The consecutive-character processing can generate the following n-grams: "schwarzeneg," "schwarzenegg," "schwarzenegge," "chwarzenegg," "chwarzenegge," "chwarzenegger," "hwarzenegge," "hwarzenegger," and "warzenegger." These n-grams include different subsets of the characters in the input string. Each n-gram is generated by starting at a different point in the original string and selecting a certain number of consecutive characters from the original string. The n-gram can be subject to length limits on the n-grams (e.g., a lower limit of 11 characters and an upper limit of 13 characters), where the length limits are less than the length of the original string.

Another example of a suitable process for generating variants is an edit distance process. The edit distance process can generate variants from an input string that require a specified number of character changes (e.g., an edit distance) to recreate the original input string. For instance, the ingestion service 120 could receive the input string "123456789" and generate the following edit-distance grams having an edit distance of one: "12345678," "123456789," "23456789," "13456789," "12456789," "12356789," "12346789," "12345789," "12345689," and "12345679." Each of the edit-distance grams can be generated by removing or modifying one character from the original string. Thus, each edit-distance gram has a difference of one character in comparison to the original string (i.e., an edit distance of one). One or more edit distances can be used to generate one or more sets of edit-distance grams (e.g., a first set of variants with an edit distance of one, a second set of variants with an edit distance of two, etc.)

Another example of a suitable process for generating variants is a double metaphone process, which could be applied to phonetic searches. The double-metaphone variant can be an encoded representation of an input string's pronunciation. For instance, the ingestion service 120 could receive an input string such as "Vijay" and generate a double-metaphone variant "FJ."

The ingestion service 120 can be configured to use multiple different types of variant-generation techniques. The variant-generation techniques can be selected to correspond to a fuzzy search logic that is intended to be supported using the process 200. For instance, in executing the process 200, the ingestion service 120 can access configuration data. The configuration data can indicate that the secure entity data repository 134 is intended to support fuzzy searches that use a combination of consecutive character processing and double metaphone processing. The ingestion service 120 can select, based on this configuration data, the consecutive character technique and double metaphone technique for generating variants of sensitive data received at block 201.

At block 203, the process 200 involves encrypting the sensitive data and the variant data. For example, the ingestion service 120 can apply a tokenization or other encryption process to the PII or other sensitive data received at block 201. The ingestion service 120 can also tokenize (or otherwise encrypt) the variants generated at block 203. The encryption process (e.g., tokenization) can be reversible. The tokenization or other encryption process can be reversible so that individual items of secure sensitive data can be temporarily decrypted and used in the clear for limited purposes (e.g., execution of a particular analytical operation requiring data in the clear).

In the example above involving consecutive character processing, the ingestion service 120 could tokenize the input string to obtain the tokenized string "wgaaevdirikkiv." The ingestion service 120 could also tokenize the consecutive-character n-grams to obtain the following tokenized n-grams: "wglaevdirik," "wglaevdirikk," "wglaevdirikki," "glaevdirikk," "glaevdirikki," "glaevdirikkiv," "laevdirikki," "laevdirikkiv," and "aevdirikkiv."

Likewise, in the example above involving edit distance processing, the ingestion service 120 could tokenize the input string. The ingestion service 120 could also tokenize the edit-distance grams to obtain the following tokenized edit-distance grams: "45678901," "456789012,"

"56789012," "56789012," "46789012," "45789012," "45689012," "45679012," "45678012," "45678912," and "45678902."

At block 204, the process 200 involves associating a common entity identifier with the encrypted sensitive data and the encrypted variant data. For example, the ingestion service 120 can obtain a common entity identifier for different items of PII (or other sensitive data) that refer to the same individual or other entity (e.g., a first record listing "Joseph R. Snuffy" and a second record listing "Joe Randall Snuffy"). In some aspects, the ingestion service 120 can generate the common entity identifier. In other aspects, the ingestion service 120 can provide PII data (either in the clear or in a tokenized format) to the entity resolution service 126. The entity resolution service 126 can determine whether the PII data matches one or more entities described by data in the secure identity data repository 134. If so, the entity resolution service 126 can retrieve the common entity identifier for that entity and provide the common entity identifier to the ingestion service 120.

At block 205, the process 200 involves storing the encrypted sensitive data, the encrypted variant data, and the common entity identifier in a searchable secure entity data object. For example, the ingestion service 120 can create or update data object in the secure identity data repository 134. The data object can include fields for tokenized sensitive data and tokenized variants of the sensitive data. In one example, a particular record could include a first column for a common entity identifier for the entity Schwarzenegger (e.g., a common entity identifier of "12345"). The record could include a second column for a tokenized version of the PII for the entity (e.g., the token "Wgaaevdirikkiv"). The record could also include one or more columns for a tokenized version of variants of the PII (e.g., one or more columns identifying tokenized n-grams, one or more columns identifying tokenized edit-distance grams, etc.).

In some aspects, including the tokenized variants in the searchable secure entity data object allows for fuzzy searching of the tokenized PII data via the tokenized variants. For instance, having edit-distance variants for the string "123456789" allows a fuzzy version of the string (i.e., "13456789") to be searched. The fuzzy version of the string can be tokenized (resulting in the tokenized string "56789012"). A querying system can perform a deterministic match on the corresponding tokenized edit-distance gram in a searchable data object (i.e., the tokenized variant "56789012" associated with a particular entity identifier). Likewise, having these variants allows for searching on an input string "schwarzeneg" by tokenizing (resulting in the tokenized string "wglaevdirik") and performing a deterministic match on the corresponding tokenized n-gram (i.e., the tokenized variant "wglaevdirik").

Figure 3:
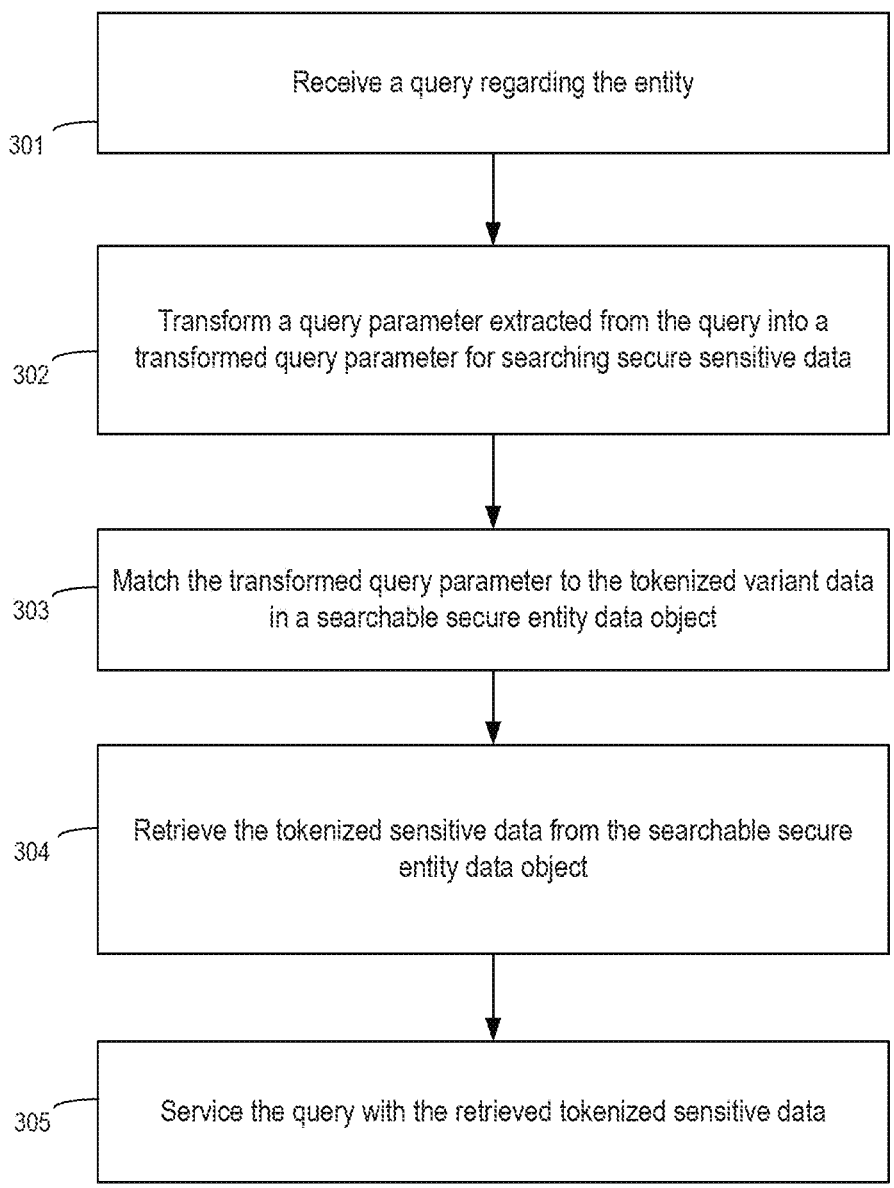
FIG. 3 is a flow chart flow chart illustrating an example of a process for fuzzy searching of tokenized or otherwise encrypted sensitive data, according to certain embodiments.

The secure data processing system 100 can also execute one or more processes that service queries using search sensitive data objects created with the process 200. For instance, FIG. 3 is a flow chart illustrating an example of a process 300 for fuzzy searching of tokenized (or otherwise encrypted) sensitive data. For illustrative purposes, the process 300 is described with reference to implementations described above with respect to one or more examples described herein. Other implementations, however, are possible. In some aspects, the steps in FIG. 3 may be implemented in program code that is executed by one or more computing devices depicted in FIG. 1.

At block 301, the process 300 involves receiving a query regarding the entity. For example, the secure data processing system 100 can establish one or more communication channels with one or more client computing systems 104 via a client external-facing subsystem 112. The secure data processing system 100 can receive one or more queries from a client computing systems 104 via these communication channels. A suitable service (e.g., the entity resolution service 126, the analytics service 130, etc.) can access the received query and service the query.

At block 302, the process 300 involves transforming a query parameter extracted from the query into a transformed query parameter for searching secure sensitive data. For example, a suitable service (e.g., the entity resolution service 126, the analytics service 130, etc.) can extract a query parameter from the query, such as the string "Schwarzenegge." In some aspects, the service can tokenize (or otherwise encrypt) the query parameter to generate a transformed query parameter. The transformed query parameter can be matched to encrypted data in a searchable secure entity data object.

In additional or alternative aspects, the service can apply one or processes for generating variants, such as the processes described above for block 202, to the extracted query parameter. The service can tokenize (or otherwise encrypt) the variants derived from the query parameter. The service can use these tokenized variants to search for corresponding entity data in the secure identity data repository 134. Using these tokenized variants of a search term can provide a fuzzy search logic capability.

At block 303, the process 300 involves matching the transformed query parameter to the tokenized variant data in a searchable secure entity data object. For example, a suitable service (e.g., the entity resolution service 126, the analytics service 130, etc.) can access tokenized variants in a searchable secure entity data object in the secure identity data repository 134. The service can match one or more of the transformed query parameters identified to one or more of the accessed tokenized variants.

At block 304, the process 300 involves retrieving the tokenized sensitive data from the searchable secure entity data object. For example, a suitable service (e.g., the entity resolution service 126, the analytics service 130, etc.) can retrieve the tokenized sensitive data from a column or other field of the searchable secure entity data object having the matching tokenized variants at block 303.

At block 305, the process 300 involves servicing the query with the retrieved tokenized sensitive data. For instance, a suitable service (e.g., the entity resolution service 126, the analytics service 130, etc.) can perform one or more operations that use the results of queries for PII or other sensitive data. Examples of these operations include entity resolution, analytics, etc. In some aspects, one or more servers of the secure data processing system 100 can decrypt the retrieved tokenized sensitive data for the limited purpose of servicing the query. For instance, certain entity resolution operations or analytical operations may require one or more items of PII in the clear. The secure data processing system 100 can delete the decrypted data (leaving only the encrypted version of the sensitive data in the secure identity data repository 134) after the query has been serviced or the relevant operation using the query results has been performed.

Example Computing System for Facilitating Queries Using Encrypted Variant Data

Figure 4:
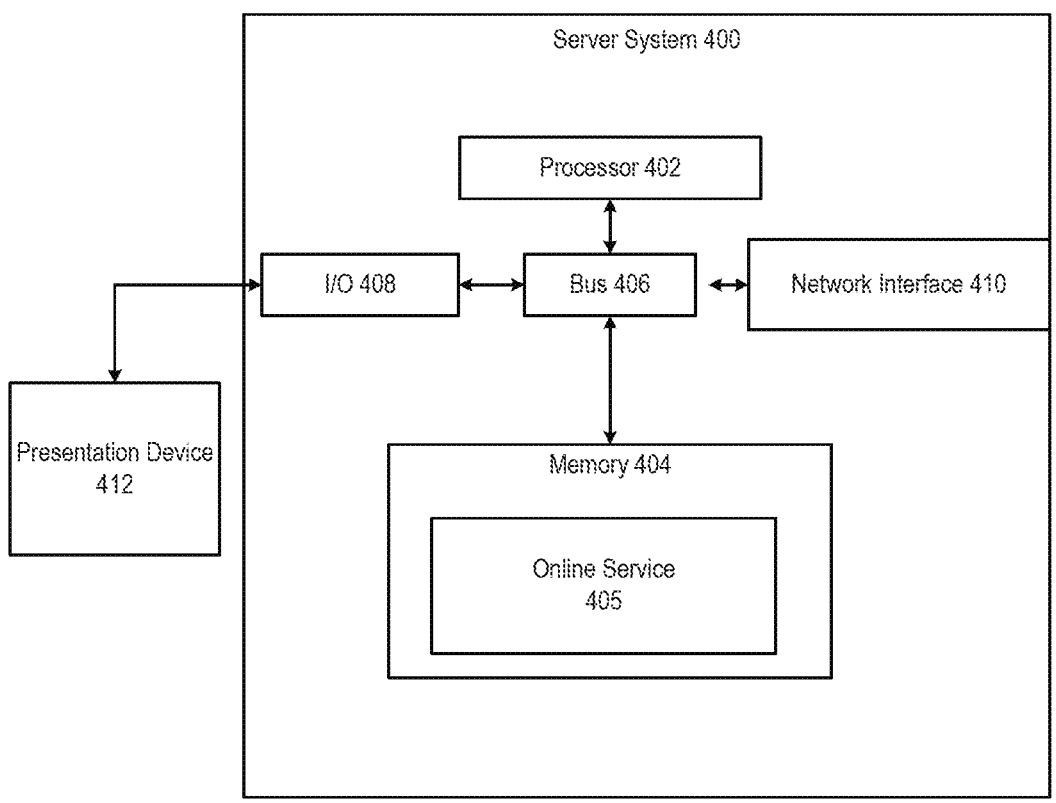
FIG. 4 is a block diagram depicting an example of a server system that could be used to implement one or more servers of a secure data processing system, according to certain embodiments.

Any suitable computing system or group of computing systems can be used to facilitate queries with encrypted variant data objects, as described herein. For example, FIG. 4 is a block diagram depicting an example of a server system 400 that could be used to implement one or more servers of the secure data processing system 100 (e.g., one or more data-ingestion servers 118, one or more entity resolution servers 124, one or more enterprise servers 128, etc.). The server system 400 can include various devices for communicating with other devices in the secure data processing system 100, as described with respect to FIG. 1. The server system can include various devices for performing one or more transformation operations described above with respect to FIGS. 1-3.

The server system 400 can include a processor 402 that is communicatively coupled to a memory 404. The processor 402 executes computer-executable program code stored in the memory 404, accesses information stored in the memory 404, or both. Program code may include machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others.

Examples of a processor 402 include a microprocessor, an application-specific integrated circuit, a field-programmable gate array, or any other suitable processing device. The processor 402 can include any number of processing devices, including one. The processor 402 can include or communicate with a memory 404. The memory 404 stores program code that, when executed by the processor 402, causes the processor to perform the operations described in this disclosure.

The memory 404 can include any suitable non-transitory computer-readable medium. The computer-readable medium can include any electronic, optical, magnetic, or other storage device capable of providing a processor with computer-readable program code or other program code. Non-limiting examples of a computer-readable medium include a magnetic disk, memory chip, optical storage, flash memory, storage class memory, ROM, RAM, an ASIC, magnetic storage, or any other medium from which a computer processor can read and execute program code. The program code may include processor-specific program code generated by a compiler or an interpreter from code written in any suitable computer-programming language. Examples of suitable programming language include Hadoop, C, C++, C #, Visual Basic, Java, Python, Perl, JavaScript, ActionScript, etc.

The server system 400 may also include a number of external or internal devices such as input or output devices. For example, the server system 400 is shown with an input/output interface 408 that can receive input from input devices or provide output to output devices. A bus 406 can also be included in the server system 400. The bus 406 can communicatively couple one or more components of the server system 400.

The server system 400 can execute program code that includes one or more of online services 405. Examples of online services 405 include the ingestion service 120, the validation service 122, the online service 405, the analytics service 130, and the fulfillment service 132. The program code for the online service 405 may be resident in any suitable computer-readable medium and may be executed on any suitable processing device. For example, as depicted in FIG. 4, the program code for the online service 405 can reside in the memory 404 at the server system 400. Executing the online service 405 can configure the processor 402 to perform one or more operations described herein.

In some aspects, the server system 400 can include one or more output devices. One example of an output device is the network interface device 410 depicted in FIG. 4. A network interface device 410 can include any device or group of devices suitable for establishing a wired or wireless data connection to one or more data networks described herein. Non-limiting examples of the network interface device 410 include an Ethernet network adapter, a modem, etc.

Another example of an output device is the presentation device 412 depicted in FIG. 4. A presentation device 412 can include any device or group of devices suitable for providing visual, auditory, or other suitable sensory output. Non-limiting examples of the presentation device 412 include a touchscreen, a monitor, a speaker, a separate mobile computing device, etc. In some aspects, the presentation device 412 can include a remote client-computing device that communicates with the server system 400 using one or more data networks described herein. In other aspects, the presentation device 412 can be omitted.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification that terms such as "processing," "computing," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computing systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Any aspects or examples may be combined with any other aspects or examples. Accordingly, it should be understood that the present disclosure has been presented for purposes of example rather than limitation, and does not preclude inclusion of such modifications, variations, or additions to the present subject matter as would be readily apparent to one of ordinary skill in the art.

The invention claimed is:

1. A secure data processing system comprising:
a processing device;
an identity data repository;
a non-transitory computer-readable memory coupled to the processing device and storing instructions,
wherein the processing device is configured for executing the instructions and thereby performing operations comprising:
receiving sensitive data about an entity;
creating, in the identity data repository and from the sensitive data, a searchable secure entity data object for the entity, wherein creating the searchable secure entity data object comprises:
generating variant data by creating copies of the sensitive data and performing one or more natural language processing techniques on the copies of the sensitive data, the variant data comprising a modified version of the sensitive data,
tokenizing the sensitive data to generate a tokenized sensitive data object and tokenizing the variant data to generate a tokenized variant data object,
associating a common entity identifier with the tokenized sensitive data object and the tokenized variant data object, and
storing the tokenized sensitive data object in a first portion of the searchable secure entity data object, the tokenized variant data object in a second portion of the searchable secure entity data object, and the common entity identifier in a third portion of the searchable secure entity data object;
receiving a query regarding the entity;
generating a tokenized query parameter from a query parameter in the query; and
servicing the query by matching the tokenized query parameter to the tokenized variant data object in the second portion of the searchable secure entity data object and retrieving the tokenized sensitive data object from the first portion of the searchable secure entity data object.

2. The secure data processing system of claim 1, wherein performing the operation of generating the variant data having the modified version of the sensitive data comprises:
determining, based on a configuration setting of the identity data repository, a form of fuzzy search logic supported by a query function of the identity data repository; and
generating the variant data based on the fuzzy search logic and the sensitive data.

3. The secure data processing system of claim 1, wherein performing the operation of generating the tokenized query parameter from the query parameter in the query comprises:
extracting the query parameter from the query; and
tokenizing the query parameter to generate the tokenized query parameter that can be matched to encrypted data in the searchable secure entity data object.

4. The secure data processing system of claim 1, wherein the common entity identifier is included in all tokenized data associated with a particular entity, and identifies the tokenized data that is based on sensitive data from different sources as being associated with the particular entity.

5. The secure data processing system of claim 1, wherein performing the operation of servicing the query by matching the tokenized query parameter to the tokenized variant data object in the second portion of the searchable secure entity data object and retrieving the tokenized sensitive data object from the first portion of the searchable secure entity data object comprises:
decrypting the tokenized sensitive data object; and
performing a service operation on the decrypted sensitive data within the identity data repository.

6. The secure data processing system of claim 5, wherein performing the operation of servicing the query by matching the tokenized query parameter to the tokenized variant data object in the second portion of the searchable secure entity data object and retrieving the tokenized sensitive data object from the searchable secure entity data object further comprises: deleting the decrypted sensitive data from the first portion of the identity data repository after completion of the service operation.

7. The secure data processing system of claim 5, wherein the query is received from a client computing device external to the identity data repository.

8. A method comprising:
receiving, by a secure data processing system, sensitive data about an entity;
creating, in an identity data repository and from the sensitive data, a searchable secure entity data object for the entity, wherein creating the searchable secure entity data object comprises:
generating variant data by creating copies of the sensitive data and performing one or more natural language processing techniques on the copies of the sensitive data, the variant data comprising a modified version of the sensitive data,
tokenizing the sensitive data to generate a tokenized sensitive data object and tokenizing the variant data to generate a tokenized variant data object,
associating a common entity identifier with the tokenized sensitive data object and the tokenized variant data object, and
storing the tokenized sensitive data object in a first portion of the searchable secure entity data object, the tokenized variant data object in a second portion of the searchable secure entity data object, and the common entity identifier in a third portion of the searchable secure entity data object;
receiving a query regarding the entity;
generating a tokenized query parameter from a query parameter in the query; and
servicing the query by matching the tokenized query parameter to the tokenized variant data object in the second portion of the searchable secure entity data object and retrieving the tokenized sensitive data object from the first portion of the searchable secure entity data object.

9. The method of claim 8, wherein generating the variant data having the modified version of the sensitive data comprises:
   determining, based on a configuration setting of the identity data repository, a form of fuzzy search logic supported by a query function of the identity data repository; and
   generating the variant data based on the fuzzy search logic and the sensitive data.

10. The method of claim 8, wherein generating the tokenized query parameter from the query parameter in the query comprises:
    extracting the query parameter from the query; and
    tokenizing the query parameter to generate the tokenized query parameter that can be matched to encrypted data in the searchable secure entity data object.

11. The method of claim 8, wherein the common entity identifier is included in all tokenized data associated with a particular entity, and identifies the tokenized data that is based on sensitive data from different sources as being associated with the particular entity.

12. The method of claim 8, wherein servicing the query by matching the tokenized query parameter to the tokenized variant data object in the second portion of the searchable secure entity data object and retrieving the tokenized sensitive data object from the first portion of the searchable secure entity data object comprises:
    decrypting the tokenized sensitive data object; and
    performing a service operation on the decrypted sensitive data within the identity data repository.

13. The method of claim 12, wherein servicing the query by matching the tokenized query parameter to the tokenized variant data object in the second portion of the searchable secure entity data object and retrieving the tokenized sensitive data object from the first portion of the searchable secure entity data object further comprises:
    deleting the decrypted sensitive data from the identity data repository after completion of the service operation.

14. The method of claim 12, wherein the query is received from a client computing device external to the identity data repository.

15. A system comprising:
    a processing device;
    a non-transitory computer-readable memory coupled to the processing device and storing a secure identity data structure comprising:
        a tokenized sensitive data object having encrypted versions of account or transaction data regarding an entity, the tokenized sensitive data object being stored in a first portion of the secure identity data structure,
        a tokenized variant data object comprising a modified version of account or transaction data, wherein the modified version of account or transaction data is generated by performing one or more natural language processing techniques on copies of the account or transaction data, the tokenized variant data object being stored in a second portion of the secure identity data structure, and
        a common entity identifier linking the tokenized sensitive data object and the tokenized variant data object; and
    a server communicatively coupled to the non-transitory computer-readable memory and configured for servicing a query regarding the entity by (i) matching a tokenized version of a query parameter to the tokenized sensitive data object stored in the first portion of the secure identity data structure and (ii) retrieving the tokenized variant data object stored in the second portion of the secure identity data structure using the common entity identifier.

16. The system of claim 15, wherein the server is further configured for servicing the query regarding the entity by decrypting the tokenized sensitive data object and performing a service operation on the decrypted sensitive data within the secure identity data structure.

17. The system of claim 16, wherein the server is further configured for servicing the query regarding the entity by deleting the decrypted sensitive data from the secure identity data structure after completion of the service operation.

18. The system of claim 15, the secure identity data structure further comprising a searchable secure entity data object for the entity comprising the tokenized sensitive data object, the tokenized variant data object, and the common entity identifier.

19. The system of claim 18, wherein the searchable secure entity data object is generated in response to receiving sensitive data for the entity.

20. The system of claim 15, wherein the non-transitory computer-readable memory further comprises a plurality of service operations having permissions to execute within the secure identity data structure.

* * * * *